(12) United States Patent
Cavallino et al.

(10) Patent No.: US 12,704,169 B2
(45) Date of Patent: Aug. 11, 2026

(54) APPARATUS WITH A DUAL-CLUTCH GEARBOX FOR A MOTOR VEHICLE

(71) Applicant: FERRARI S.P.A., Modena (IT)

(72) Inventors: Carlo Cavallino, Modena (IT); Antonio Foderaro, Modena (IT)

(73) Assignee: FERRARI S.P.A. (IT)

( * ) Notice: Subject to any disclaimer, the term of this patent is extended or adjusted under 35 U.S.C. 154(b) by 0 days.

(21) Appl. No.: 19/014,582

(22) Filed: Jan. 9, 2025

(65) Prior Publication Data

US 2025/0224020 A1 Jul. 10, 2025

(30) Foreign Application Priority Data

Jan. 10, 2024 (IT) ........................ 102024000000339

(51) Int. Cl.
*F16H 3/00* (2006.01)
*F16H 3/093* (2006.01)

(52) U.S. Cl.
CPC ............. *F16H 3/006* (2013.01); *F16H 3/093* (2013.01); *F16H 2003/0938* (2013.01)

(58) Field of Classification Search
CPC .. F16H 3/006; F16H 3/093; F16H 2003/0938; F16H 2200/0056; F16H 3/089; F16H 3/091; F16H 3/085; F16H 3/10; F16H 57/02; F16H 57/023; F16H 2057/02039; F16H 61/688; F16H 2063/025; F16H 2003/0822; F16H 2061/0433; B60K 6/24; B60K 6/26; B60K 6/36; B60K 6/38; B60K 2006/268
See application file for complete search history.

(56) References Cited

U.S. PATENT DOCUMENTS 7,313,981 B2 * 1/2008 Gumpoltsberger ..... F16H 3/089 74/330
12,024,019 B2 * 7/2024 Rulfi Fertilio ......... B60K 6/387

FOREIGN PATENT DOCUMENTS

DE 102010010436 A1 9/2011
DE 102006036758 B4 * 3/2015 ...... B60W 30/18027
DE 102019216464 A1 4/2021
EP 2730815 A1 5/2014
JP 2003237393 A * 8/2003 ............. F16H 3/006

OTHER PUBLICATIONS

English Translation of JP-2003237393-A (Year: 2003).*
English Translation of DE-102019216464-A1 (Year: 2021).*
English Translation of DE-102006036758-B4 (Year: 2015).*
English Translation of DE 102010010436 A1 (Year: 2011).*
Italian Search Report and Written Opinion, Italian Patent Application 202400000339, Completion Date Jun. 13, 2024, 7 pp.

* cited by examiner

*Primary Examiner* — Victor L MacArthur
(74) *Attorney, Agent, or Firm* — The Belles Group, P.C.

(57) ABSTRACT

An apparatus with a dual-clutch gearbox for a motor vehicle is disclosed. The apparatus can comprise an input shaft, a first shaft, a second shaft, and a double clutch controllable to selectively connect one of the first and second shafts with the input shaft. The apparatus further comprises an output shaft and a plurality of engagement devices operable to selectively connect one of the first and second shafts with the output shaft.

19 Claims, 4 Drawing Sheets

D
C
8
19
24
24"
24'
14"
14
14'
22
13"
13'
13
4
12"
12
12'
33
21
11"
11'
11
10'
10
10"
18
20
9
9"
23
16
9'
B
7
17
6
5
3
A

D
C
8
19'
24
24'
24"
14"
14'
14
22
13"
13'
13
4
12"
12'
12
33
21
11"
11'
11
10'
10
10"
18
20
9
9"
23
16
9'
B
17
7
6
5
3
A

APPARATUS WITH A DUAL-CLUTCH GEARBOX FOR A MOTOR VEHICLE

CROSS-REFERENCE TO RELATED APPLICATION

This patent application claims priority from Italian patent application no. 102024000000339 filed on Jan. 10, 2024, the entire disclosure of which is incorporated herein by reference.

TECHNICAL FIELD

The invention relates to an apparatus with a dual-clutch gearbox for a motor vehicle.

BACKGROUND

As it is known, some electric hybrid motor vehicles, namely provided with an internal combustion engine and with at least one electric motor-generator for the propulsion, are provided with a dual-clutch gearbox. Typically, a dual-clutch gearbox includes a secondary shaft or output shaft defining an output of the gearbox or connected to at least one axle of the motor vehicle, as well as two primary shafts respectively connected to an input of the gearbox by means of respective clutches arranged in parallel and defining a dual clutch. The two primary shafts respectively carry first and second gearwheels, which, by meshing with corresponding third gearwheels carried by the secondary shaft, determine a first group of gears, normally the even gears, and a second group of gears, normally the odd gears, respectively.

For the engagement of one of the gears, one of the two gearwheels forming the gear to be engaged is caused to become rotationally fixed to the related carrying shaft among the primary shafts and the secondary shaft by means of an engagement device, for example a synchronizer, while the other of the two gearwheels is configured, in itself, to be rotationally fixed to the related carrying shaft among the primary shafts and the secondary shaft. Generally speaking, there is a need to provide an alternative dual-clutch gearbox compared to those already known. More specifically, there is a need to provide a dual-clutch gearbox with smaller dimensions, while having efficiency and effectiveness at least comparable to those already known.

An object of the invention is to fulfil one of the needs discussed above, preferably in a simple and reliable fashion.

DESCRIPTION OF THE INVENTION

In one form, the invention can be an apparatus with a dual-clutch gearbox for a motor vehicle, the dual-clutch gearbox comprising an input shaft to be connected to a power source of the motor vehicle, a first shaft extending along a straight axis and carrying a plurality of first gearwheels, each of the first gearwheels being carried either in a fixed manner by the first shaft, thus defining an element of a set of first rotationally fixed gearwheels, or in a rotatable manner with respect to the first shaft, thus defining an element of a set of first engageable gearwheels, a second shaft carrying a plurality of second gearwheels, each of the second gearwheels being carried in a fixed manner by the second shaft, thus defining an element of a set of second rotationally fixed gearwheels, or in a rotating manner with respect to the second shaft, thus defining an element of a set of second engageable gearwheels, an output shaft to be connected to an axle of the motor vehicle, the output shaft carrying a plurality of third gearwheels meshing with the first gearwheels to form first gears and a plurality of fourth gearwheels meshing with the second gearwheels to form second gears, wherein the third and fourth gearwheels meshing with the first and second engageable gearwheels, respectively, are carried in a fixed manner by the output shaft, thus defining respective elements of a set of rotationally fixed third gearwheels, and wherein the third and fourth gearwheels meshing respectively with the first and second rotationally fixed gearwheels are rotatably carried with respect to the output shaft, thus defining respective elements of a set of third engageable gearwheels, a double clutch selectively controllable to connect one between the first and second shafts with the input shaft, a first engagement means for each of the first engageable gearwheels, the first engagement means being controllable for rotationally fixing the relative between the first engageable gearwheels to the first shaft selectively, a second engagement means for each of the second engageable gearwheels, the second engagement means being controllable for rotationally fixing the relative between the second engageable gearwheels to the second shaft selectively, wherein at least a fifth toothed wheel between the third gearwheels and a sixth toothed wheel between the fourth gearwheels belong to the set of the third engageable gearwheels, a third engagement means arranged axially between the fifth gearwheel and the sixth gearwheel and controllable to selectively and mutually exclusive rotationally fix either the fifth gearwheel or the sixth gearwheel to the output shaft, and a fourth engagement means for each of the remaining third engageable gearwheels beyond the fifth and sixth gearwheels, the fourth engagement means being controllable to rotationally fix the relative between the third engageable gearwheels to the output shaft selectively.

In one form, the invention can be a transmission for a motor vehicle, the transmission comprising an input shaft configured to be connected to a power source of the motor vehicle, a first shaft extending along a straight axis and carrying a plurality of first gearwheels, each of the first gearwheels being carried either in a fixed manner by the first shaft, thus defining an element of a set of first rotationally fixed gearwheels, or in a rotatable manner with respect to the first shaft, thus defining an element of a set of first engageable gearwheels, a second shaft carrying a plurality of second gearwheels, each of the second gearwheels being carried in a fixed manner by the second shaft, thus defining an element of a set of second rotationally fixed gearwheels, or in a rotating manner with respect to the second shaft, thus defining an element of a set of second engageable gearwheels, an output shaft configured to be connected to an axle of the motor vehicle, the output shaft carrying a plurality of third gearwheels meshing with the first gearwheels to form first gear trains, each of the third gearwheels being carried in a fixed manner by the output shaft, thus defining an element of a set of third rotationally fixed gearwheels, or in a rotating manner with respect to the output shaft, thus defining an element of a set of third engageable gearwheels, and a plurality of fourth gearwheels meshing with the second gearwheels to form second gear trains, each of the fourth gearwheels being carried in a fixed manner by the output shaft, thus defining an element of a set of fourth rotationally fixed gearwheels, or in a rotating manner with respect to the output shaft, thus defining an element of a set of fourth engageable gearwheels, a double clutch controllable to selectively connect one of the first and second shafts with the input shaft, at least one first engagement device controllable for rotationally fixing the first engageable gearwheels to the first shaft selectively, at least one second engagement device controllable for rotationally fixing the second engageable gearwheels to the second shaft selectively, a third engagement device arranged between a said third gearwheel and a said fourth gearwheel and controllable to selectively and mutually exclusive rotationally fix either the said third gearwheel or the said fourth gearwheel to the output shaft, and a fourth engagement device controllable to rotationally fix another said third gearwheel to the output shaft selectively.

In one form, the invention can be a motor vehicle comprising a first power drive, a second power drive, a drive axle, and a transmission. The transmission comprises an input, a first shaft carrying a plurality of first gearwheels, each of the first gearwheels being carried either in a fixed manner by the first shaft, thus defining an element of a set of first rotationally fixed gearwheels, or in a rotatable manner with respect to the first shaft, thus defining an element of a set of first engageable gearwheels, a second shaft carrying a plurality of second gearwheels, each of the second gearwheels being carried in a fixed manner by the second shaft, thus defining an element of a set of second rotationally fixed gearwheels, or in a rotating manner with respect to the second shaft, thus defining an element of a set of second engageable gearwheels, an output shaft connected to the drive axle, the output shaft carrying a plurality of third gearwheels meshing with the first gearwheels to form first gear trains, each of the third gearwheels being carried in a fixed manner by the output shaft, thus defining an element of a set of third rotationally fixed gearwheels, or in a rotating manner with respect to the output shaft, thus defining an element of a set of third engageable gearwheels, and a plurality of fourth gearwheels meshing with the second gearwheels to form second gear trains, each of the fourth gearwheels being carried in a fixed manner by the output shaft, thus defining an element of a set of fourth rotationally fixed gearwheels, or in a rotating manner with respect to the output shaft, thus defining an element of a set of fourth engageable gearwheels, a double clutch controllable to selectively connect one of the first and second shafts with the input, at least one first engagement device controllable for rotationally fixing the first engageable gearwheels to the first shaft selectively, at least one second engagement device controllable for rotationally fixing the second engageable gearwheels to the second shaft selectively, a third engagement device arranged between a said third gearwheel and a said fourth gearwheel and controllable to selectively and mutually exclusive rotationally fix either the said third gearwheel or the said fourth gearwheel to the output shaft, and a fourth engagement device controllable to rotationally fix another said third gearwheel to the output shaft selectively.

BRIEF DESCRIPTION OF THE DRAWINGS

Hereinafter, an embodiment of the invention will be described, in order to allow the latter to be better understood, by way of non-limiting example and with reference to the accompanying drawings, wherein.

DETAILED DESCRIPTION OF THE INVENTION

Figure 1:
FIG. 1 is a perspective view of a motor vehicle comprising an apparatus with a dual-clutch gearbox according to the invention.

In FIG. 1, reference number 1 is used to indicate, as a whole, a motor vehicle.

The motor vehicle 1 comprises four wheels 2, at least two of them being drive wheels and being coupled to one another by means of an axle, for example of a known type and not shown.

The motor vehicle 1 further comprises a power or torque source 3, in particular an internal combustion engine.

The motor vehicle 1 further comprises an apparatus preferably comprising, in turn, a further source of power or torque, in particular an electric motor-generator 4, and a dual-clutch gearbox 5.

The dual-clutch gearbox 5 comprises an outer casing (not shown), which houses at least part of all the components of the gearbox 5 itself.

The dual-clutch gearbox 5 comprises an input shaft 6 connected to the source 3, namely caused to rotate by the source 6. Specifically, the shaft 6 extends along an axis A, for example a straight axis.

Furthermore, the gearbox 5 comprises two primary shafts 7, 8, namely a first and a second shaft 7, 8, in other words.

The shaft 7 specifically extends along an axis B (for example, a straight axis), in particular parallel to and more in particular coinciding with the axis A.

Preferably, the shaft 8 is coaxial to the shaft 7, namely it extends along an axis C that is parallel to and coinciding with the axis B. Alternatively, the axis C could only be parallel to and not coinciding with the axis B or not even parallel to the axis B, according to variants that are not shown herein.

The shaft 7 carries a plurality of gearwheels 9', 10', 11', each of which can be carried in a fixed manner by the shaft 7, namely can be attached to the shaft 7, or in a rotatable manner with respect to the shaft 7 around the axis B, i.e. so as to be able to rotate around the axis B independently of the rotation of the shaft 7.

In this way, the gearwheels of the gearwheels 9', 10', 11' carried in a fixed manner define elements of a set of first rotationally fixed gearwheels, while the gearwheels of the gearwheels 9', 10', 11' carried in a rotatable manner define elements of a set of first rotatable or engageable gearwheels.

In general, hereinafter, the engageable gearwheels are radially carried in a rotatable manner by means of respective radial bearings, for example of a known type, which are only schematically shown.

Similarly, the shaft 8 carries a plurality of gearwheels 12', 13', 14', each of which can be carried in a fixed manner by the shaft 8, i.e. can be attached to the shaft 8, or in a rotatable manner with respect to the shaft 8 around the axis C, i.e. so as to be able to rotate around the axis C independently of the rotation of the shaft 8.

In this way, the gearwheels of the gearwheels 12', 13', 14' carried in a fixed manner define elements of a set of second rotationally fixed gearwheels, while the gearwheels of the gearwheels 12', 13', 14' carried in a rotatable manner define elements of a set of second rotating or engageable gearwheels.

Furthermore, the gearbox 5 comprises an output shaft or secondary shaft 16 connected to the axle or (drive) wheels 2, namely configured to transmit a rotation thereof to the axle or to the wheels 2.

The output shaft 16 extends along an axis D, for example a straight axis, specifically parallel to the axis B and, independently, also to the axis C.

The output shaft 16 carries a plurality of gearwheels 9", 10", 11", 12", 13", 14" respectively meshing with the gearwheels 9', 10', 11', 12', 13', 14' to form respective gears 9, 10, 11, 12, 13, 14.

The gearwheels of the gearwheels 10", 11", 12", 13", 14" that respectively mesh with the engageable gearwheels are carried in a fixed manner by the shaft 16, thus defining respective elements of a third set of rotationally fixed gearwheels, while the gearwheels of the gearwheels 10", 11", 12", 13", 14" that mesh with the rotationally fixed gearwheels are carried in a rotatable manner with respect to the shaft 16 around the axis D, thus defining respective elements of a third set of engageable gearwheels.

In the embodiment shown herein, the gearwheel 10' is an engageable gearwheel, namely it is carried by the shaft 7 in a rotatable manner around the axis B.

Consequently, the gearwheel 10" is a rotationally fixed gearwheel, namely it is carried by the shaft 16 in a rotationally fixed manner with respect to the shaft 16.

In addition, the gearwheel 11' and, independently, the gearwheels 12', 13', 14' are rotationally fixed gearwheels, namely they are carried by the shaft 8 in a fixed manner, namely they are attached to it, respectively.

Consequently, the gearwheels 11", 12", 13", 14" are engageable gearwheels, namely they are carried by the shaft 16 in a rotatable manner with respect to the shaft 16 around the axis D.

Conveniently, the gearwheels 9', 9" meshing with each other to form the gear 9 are both carried by the respective shafts 7, 16 in a rotatable manner with respect to the shafts 7, 16, respectively, whereby the gearwheels 9', 9" are both engageable gearwheels, i.e. forming part of the set of first and third engageable gearwheels, respectively, namely defining respective elements of the set of first engageable gearwheels and of the set of third engageable gearwheels.

According to an alternative that is not shown herein, the gearwheel 9" is carried by the output shaft 16 in a fixed manner with respect to the output shaft 16, namely it is attached to it. Here, the gearwheel 9" would be part of the set of rotationally fixed gearwheels, namely it would define an element of the set of rotationally fixed gearwheels.

In order to engage the gears 9, 10, 11, 12, 13, 14, the gearbox 5 comprises a plurality of engagement devices, including an engagement device 17 configured or controllable to selectively connect one of the shaft 7 and the shaft 8 to the input shaft 6, so that the connected shaft of the shafts 7, 8 is caused to rotate by the rotation of the shaft 6 or by the source 3, as well as engagement or selection devices 18, 20, 21, 22 configured or controllable to engage, i.e. to rotationally fix the engageable gearwheels to the related carrying shafts of the shafts 7, 16.

The apparatus of the motor vehicle 1 comprises a control unit ECU configured to control each of the engagement devices 17, 18, 20, 21, 22.

Figure 2:
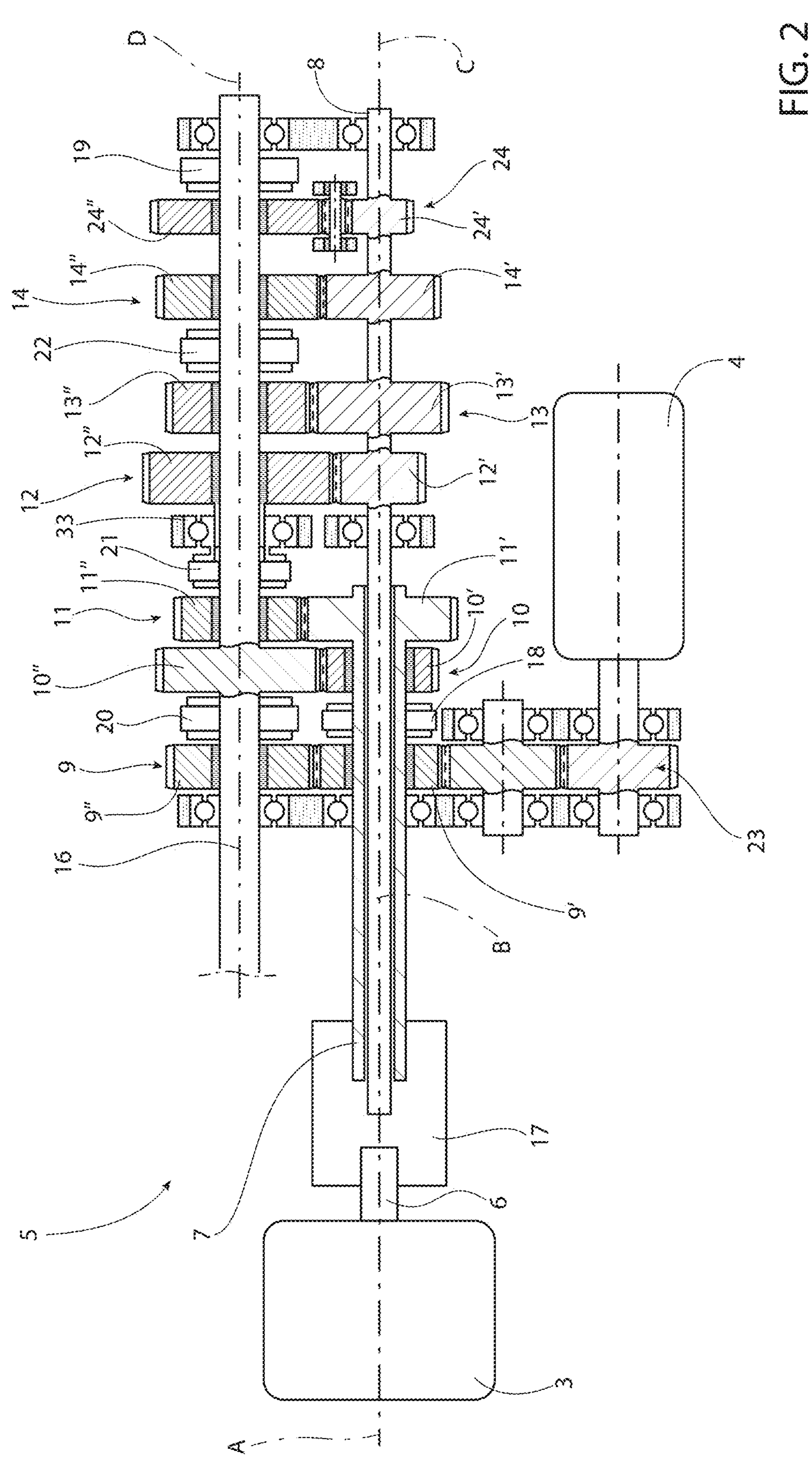
FIG. 2 is a schematic, cross-sectional representation of the architecture of the dual-clutch gearbox.

In particular, the engagement device 17 is a dual clutch (for example of a known type, which is schematically shown in FIG. 2 with a rectangle), namely a device comprising two clutches respectively configured or controllable to connect the shaft 7 and the shaft 8 to the shaft 6 in an alternative or mutually exclusive manner.

The engagement or selection devices 18, 20, 21, 22 could be toothed dog-clutches or synchronizers.

Preferably, the engagement device 20 is a dog-clutch. Clearly, in the alternative where the gearwheel 9" is fixed to the shaft 16, the engagement device 20 would be absent.

Furthermore, preferably, each of the engagement devices 18, 21, 22 is a synchronizer.

Specifically, the engagement device 18 is configured or controllable to selectively engage, i.e. to rotationally fix to the shaft 7, one of the gearwheels 9', 10'. Hence, the function of the engagement device 18 is shared by the gearwheels 9', 10'; this is however not to be understood as a necessarily limiting example, since the engagement device 18 can be functionally considered as two independent engagement devices, each of which is dedicated to engaging the corresponding one of the gearwheels 9', 10'. As a matter of fact, the engagement device 18 is controlled to engage the gearwheel 9' or the gearwheel 10' in an alternative or mutually exclusive manner, whereby it cannot simultaneously engage the gearwheels 9', 10'. In addition, the engagement device 18 could also be replaced by two totally independent and separate engagement devices, as well as dedicated to engaging the wheels 9', 10', respectively. Similar observations also apply to the other engagement or selection device 22, which is why they will not be repeated for the sake of brevity.

In particular, the engagement device 18 is carried by the shaft 7 axially between the gearwheels 9', 10', more in particular in an axially movable manner along the axis B.

The engagement device 20 is configured or controllable to selectively engage, i.e. to rotationally fix to the shaft 16, the gearwheel 9".

In particular, the engagement device 20 is carried by the shaft 16 axially between the gearwheels 9", 10", more in particular in an axially movable manner along the axis D.

The engagement device 21 is configured or controllable to engage, i.e. to rotationally fix, in a selective and mutually exclusive manner either the gearwheel 11" or the gearwheel 12" to the shaft 16.

Furthermore, the engagement device 21 is carried by the shaft 16 axially between the gearwheels 11", 12", in particular in an axially movable manner along the axis D.

In other words, the engagement device 21 is configured or controllable to selectively engage, i.e. to rotationally fix to the shaft 16, one of the gearwheels 11", 12". Hence, the function of the engagement device 21 is shared by the gearwheels 11", 12". Furthermore, the engagement device 21 cannot simultaneously engage the gearwheels 11", 12".

The engagement device 22 is configured or controllable to selectively engage, i.e. to rotationally fix to the shaft 16, one of the gearwheels 13", 14".

In particular, the engagement device 22 is carried by the shaft 16 axially between the gearwheels 13", 14", more in particular in an axially movable manner along the axis D.

To sum up, the gearbox 5 comprises a first engagement device (here, the device 18) for each of the first engageable gearwheels (here, the gearwheels 9', 10') and a third engagement device (here, one of the devices 20, 21, 22) for each of the third engageable gearwheels (here, the gearwheels 9", 11", 12", 13", 14").

In the specific embodiment shown herein, the set of second engageable gearwheels is an empty set, since none of the gearwheels 12', 13', 14' is carried in a rotatable manner with respect to the shaft 8, whereby a second engagement device is therefore absent. However, according to other embodiments that are nor shown herein, a second engagement device could be provided to rotationally fix each of the second gearwheels engageable to the shaft 8 (for example, the gearwheels 13', 14' could be engageable instead of the gearwheels 13", 14", which in this case would be rotationally fixed to the shaft 16).

The motor-generator 4 comprises a rotor (not shown) coupled or connected to the gearwheel 9' through a transmission 23, for example comprising or defined by a reduction gear unit, such that a rotation of the rotor can be transmitted to the gearwheel 9' and vice versa.

For example, the transmission 23 can comprise an engagement or clutch device (not shown) to selectively determine and interrupt the coupling or connection between the rotor and the gearwheel 9'.

The gears 9, 10, 11, 12, 13, 14 define six respective gear ratios or gears numerically orderable in an ascending order from a first gear ratio or gear to a last (herein, sixth) gear ratio or gear corresponding to six respective degrees of reduction of the input angular speed (angular speed of one of the shafts 7, 8) gradually decreasing from the first to the sixth gear ratio. In other words, the angular speed of the shaft 16 is reduced with respect to the input angular speed by means of the gears 9, 10, 11, 12, 13, 14 according to the respective gear ratios.

Herein, the gear ratio is defined as a reduction ratio, i.e. as a number smaller than or equal to one resulting from the ratio between the angular speed of the shaft 16 and the input angular speed (angular speed of the shaft 7 or 8, depending on the engaged gear of the gears 9, 10, 11, 12, 13, 14).

The first gear ratio is the smallest, while the sixth gear ratio is the greatest, namely the closest to one. The gear ratios are therefore increasing from the first to the sixth gear ratio, in their numerical order.

The gear ratios are divisible into even ratios and odd ratios according to their numerical order (first, third, fifth are odd ratios, while second, fourth and sixth are even ratios).

Consequently, the gears 9, 10, 11, 12, 13, 14, each of which is associable with a corresponding one of the gear ratios, can define the even gears 9, 10, 11 and the odd gears 12, 13, 14 as well. Hence, the even gears 9, 10, 11 define the even ratios, while the odd gears 12, 13, 14 define the odd ratios.

Hence, the gearwheels 11", 12" are part of the gears 11, 12 respectively defining one of the even ratios and one of the odd ratios.

Specifically, the even ratio and the odd ratio related to the gearwheels 11", 12" are the first and last (herein, the sixth) of the gear ratios according to their ascending numerical order. Therefore, the gears 11, 12 define the first and the sixth gear ratio.

Hence, in other words, the gearwheels 11" and 12" respectively have a minimum and maximum diameter with respect to the other gearwheels 9", 10", 13", 14". Therefore, the gearwheel 11" has the smallest diameter with respect to that of the other gearwheels 9", 10", 12", 13", 14"; furthermore, the gearwheel 12" has the largest diameter with respect to that of the other gearwheels 9", 10", 11", 13", 14".

The gear 9 preferably defines the fourth gear ratio. In other words, the gearwheel 9" has a diameter that is larger than that of two other of the wheels 10", 11", 12", 13", 14" and smaller than that of three other of the wheels 10", 11", 12", 13", 14".

Furthermore, the gear 10 preferably defines the second gear ratio. In other words, the gearwheel 10" has a diameter that is larger than that of five other of the wheels 9", 11", 12", 13", 14" and smaller than that of another of the wheels 9", 11", 12", 13", 14".

The gear 10 is axially arranged between the gears 9, 11 (according to the axis B or the axis D).

Independently, the gear 11 is axially arranged between the gears 10, 12 (according to the axis B or D).

Independently, the gear 9 is axially arranged between the gear 10 and the engagement device 17 (according to the axis B or D).

Furthermore, the gear 13 preferably defines the fifth gear ratio. In other words, the gearwheel 13" has a diameter that is larger than that of another of the wheels 9", 10", 11", 12", 14" and smaller than that of four other of the wheels 9", 10", 11", 12", 14".

Furthermore, the gear 14 preferably defines the third gear ratio. In other words, the gearwheel 14" has a diameter that is smaller than that of two other of the wheels 9", 10", 11", 12", 13" and larger than that of three other of the wheels 9", 10", 11", 12", 13".

The gear 12 is axially arranged between the gears 11, 13 (according to the axis C or the axis D).

Independently, the gear 13 is axially arranged between the gears 12, 14 (according to the axis B or D).

Therefore, according to the embodiment shown herein, the diameter of the gearwheel 9" is between that of the gearwheel 13" and that of the gearwheel 14".

The diameter of the gearwheel 10" is between that of the gearwheel 12" and that of the gearwheel 14".

The diameter of the gearwheel 13" is between that of the gearwheel 9" and that of the gearwheel 11".

The diameter of the gearwheel 14" is between that of the gearwheel 10" and that of the gearwheel 9".

Furthermore, more generally, two axially adjacent gears of the gears 9, 10, 11, 12, 13, 14, 15 define respective gear ratios astride (according to their numerical order) the one defined by another non-adjacent gear of the gears 9, 10, 11, 12, 13, 14, 15. More in detail, if the two axially adjacent gears are even, the other non-adjacent gear is odd and vice versa (if the two adjacent gears are odd, the other is even).

Optionally, the gearbox 5 further comprises a reverse gear 24 comprising at least two gearwheels 24', 24" respectively carried by one of the shafts 7, 8 and the shaft 16.

Specifically, the gearwheel 24" is carried by the shaft 16 in a rotatable manner with respect to it around the axis D, while the gearwheel 24' is carried by one of the shafts 7, 8, in a fixed manner with respect to it, namely it is attached to it. Alternatively, according to a variant which is not shown herein, the gearwheel 24' could have been carried by one of the shafts 7, 8 in a rotatable manner with respect to it around the axis B or C, while the gearwheel 24" could have been carried by the shaft 16 in a fixed manner with respect to it.

Specifically, moreover, the gearwheel 24" is selectively rotationally fixable to the shaft 16 by means of an engagement device, in particular by means of an engagement device 19, for example comprising a synchronizer.

Herein, the reverse gear 24 is axially arranged (according to the axis D or B) between the engagement device 19 and the gear 14. According to the variant that is not shown herein, the gearwheel 24' could have been selectively rotationally fixable to one of the shafts 7, 8 by means of an engagement device.

Therefore, the gearwheel 24' could define an element of the set of first engageable gearwheels or of the second engageable gearwheels depending on whether it is carried by the shaft 7 or by the shaft 8, respectively. Alternatively, the gearwheel 24" could define an element of the set of third engageable gearwheels.

In the embodiment shown herein, the gearwheel 24' is carried by the shaft 8 and, more in particular, is carried in a fixed manner by the shaft 8, whereby the gearwheel 24" is carried in a rotatable manner with respect to the shaft 16, namely it defines an element of the set of third engageable gearwheels.

The gear 14 is axially arranged (according to the axis B or D) between the gear 13 and the reverse gear 24.

Therefore, the reverse gear 24 is arranged at an axial end of the gearbox 5 opposite a further axial end comprising the engagement device 17, according to the axis B.

Being optional, the reverse gear 24 could be absent.

The engagement devices 17, 18, 19, 20, 21, 22 described above can be operated by respective actuators (not shown), which are controlled by the control unit ECU. The control unit ECU controls the engagement devices 17, 18, 19, 20, 21, 22 by sending electrical control signals addressed to them.

The control unit ECU is configured to control the engagement devices 17, 18, 19, 20, 21, 22 through direct input command of the driver of the motor vehicle 1 or in an automatic manner following a gear shift control logic deployed in a specific software code, which can be stored in the control unit ECU.

The apparatus of the motor vehicle 1 can be provided with a dedicated control software code in the ECU of the transmission configured to recognize signals from the sensors installed in the motor vehicle 1, for example the torque request at the output shaft 16 and the angular speed of the input shaft 6, and to automatically define the gear shift without any intervention by the driver.

Figure 3:
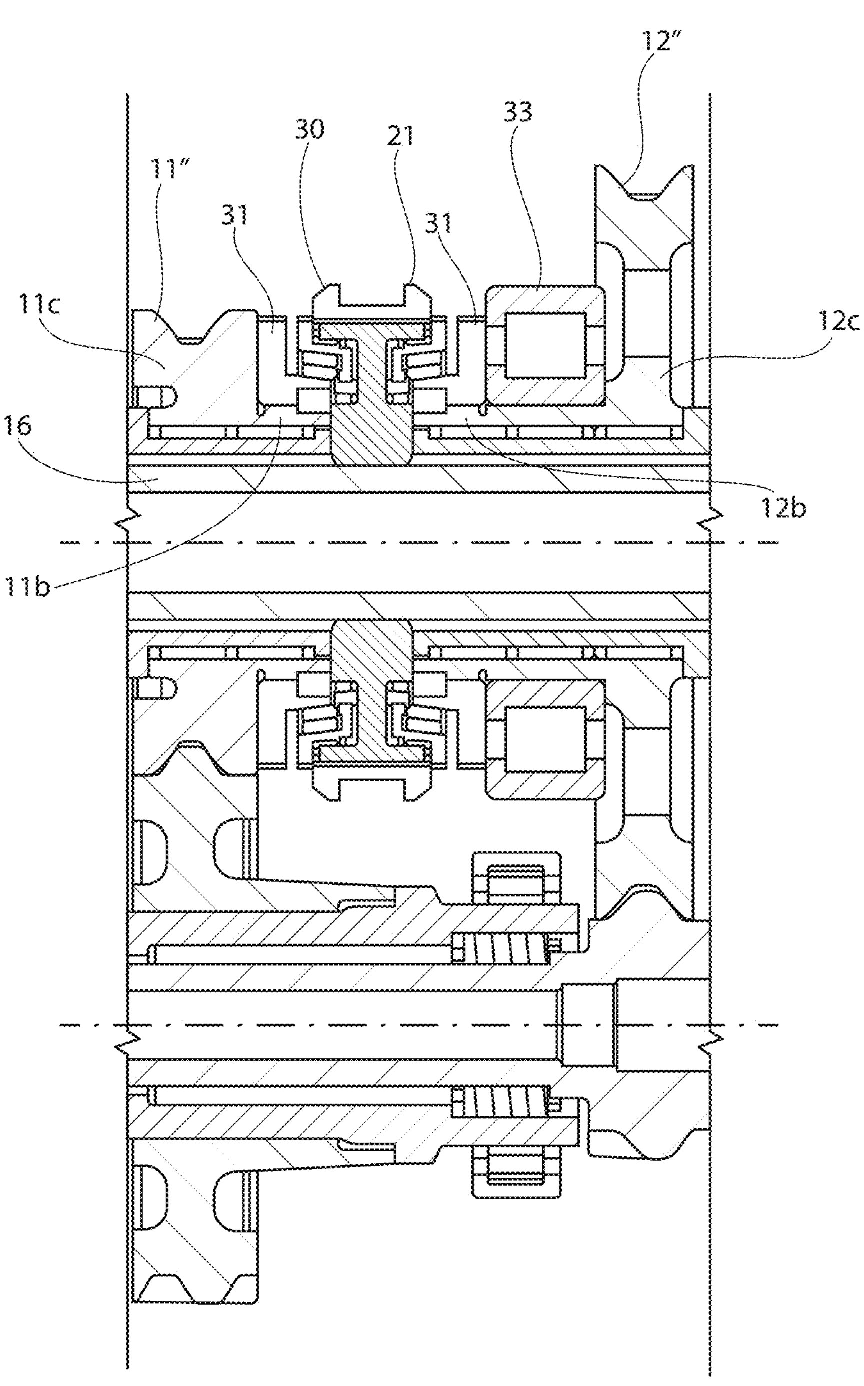
FIG. 3 shows a longitudinal section of a detail portion of the dual-clutch gearbox.
Figure 4:
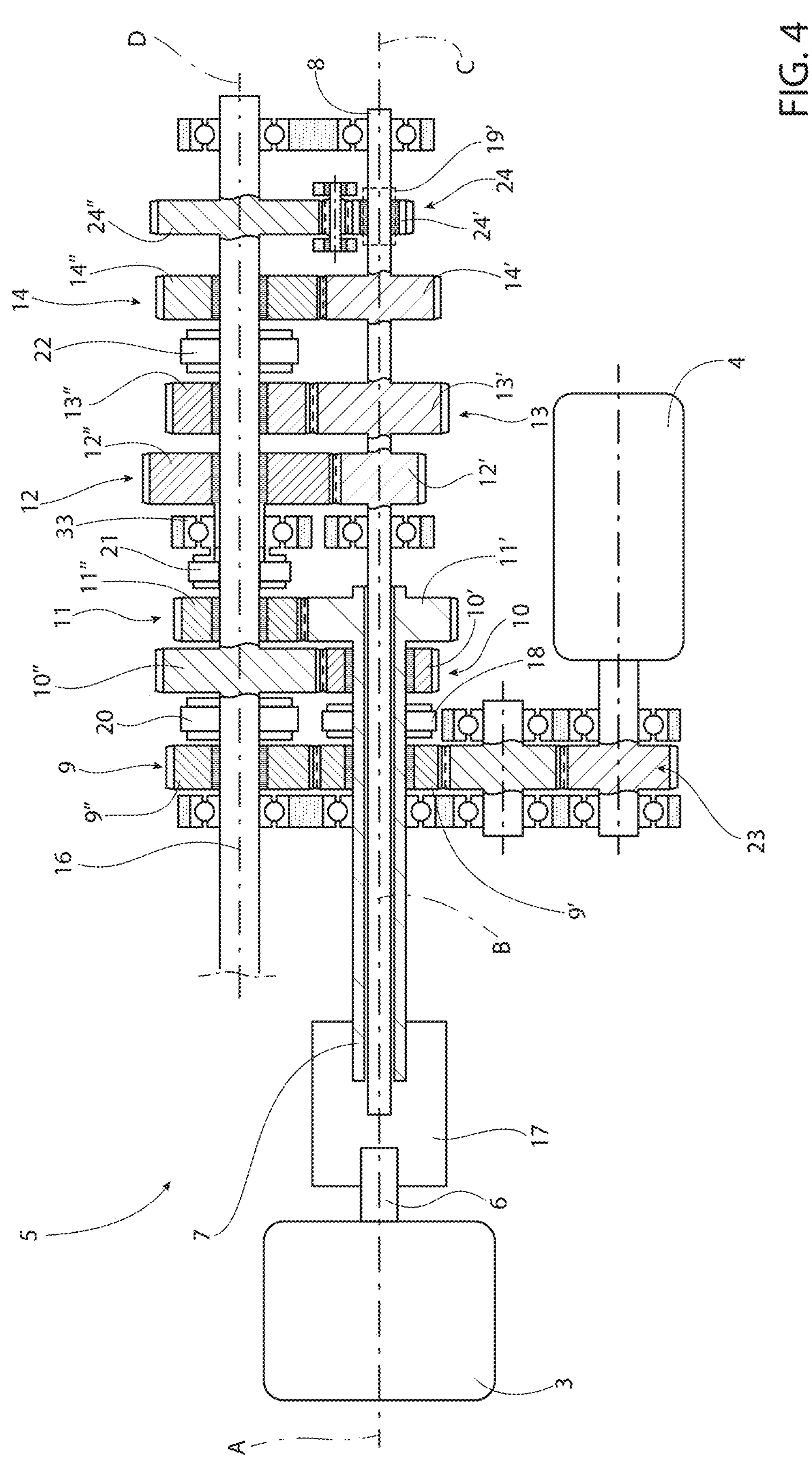
FIG. 4 is an alternative schematic, cross-sectional representation of the architecture of the dual-clutch gearbox.

Considering now in greater detail the particular construction of the engagement device 21 with reference to FIG. 3, the engagement device 21 comprises a sleeve element or sleeve 30 rotationally fixed to the shaft 16 and axially slidable on the shaft 16 between the gearwheels 11", 12" to engage with an axial end 12*b* of the gearwheel 12" or an axial end 11*b* of the gearwheel 11".

The gearwheels 11", 12" have respective axial ends or portions 11*c*, 12*c* axially opposite, namely according to the axis D, the axial ends or portions 11*b*, 12*b*.

Specifically, the sleeve 30 is arranged around the axis D.

In particular, the sleeve 30 is internally grooved on its radially innermost surface, namely it has an inner toothing that engages in an axially sliding manner on radial grooves of the radially outermost surface of the shaft 16.

The sleeve 30 is axially arranged between the portions 11*b*, 12*b*, which are supported by the shaft 16 in a rotatable manner around the latter, in particular by means of bearings that are shown only conceptually or schematically. Therefore, the sleeve 30 is axially movable towards any one of the portions 11*b*, 12*b* to be engaged therewith.

The sleeve 30 is caused to translate along the axis D by the actuator of the engagement device 21.

Since the engagement device 21 specifically comprises a synchronizer, the engagement device 21 comprises a synchronizer ring 31 for each of the portions 11*b*, 12*b* arranged between the sleeve 31 and the corresponding one of the portions 11*b*, 12*b*.

The synchronizer rings 31 are identical to each other, so that only one of them will be described in detail below.

The synchronizer ring 31 has a grooved outer surface that is configured to cooperate in contact with the inner toothing of the sleeve 30 during an axial movement thereof towards a corresponding one of the portions 11*b*, 12*b*.

Furthermore, the synchronizer ring 31 has an inner friction surface, in particular a conical one, which is arranged to cooperate in contact with the corresponding one of the portions 11*b*, 12*b*.

More in detail, during the axial movement of the sleeve 30 towards the portion 12*b*, the inner toothing of the sleeve 30 is brought into axial contact with the outer grooved surface of the synchronizer ring 31. Here, the shape of the outer grooves is configured so that an immediate engagement does not occur, but so that an axial thrust is exerted by the sleeve 30 upon the synchronizer ring 31.

In this way, the inner friction surface of the synchronizer ring 31 presses on the portion 12*b*, so that a synchronization between the sleeve 30 and the portion 12*b* takes place thanks to the friction.

When the synchronization is complete, the inner toothing of the sleeve 30 is fully engaged with the outer grooves of the synchronizer ring 31 so as to be able to axially slide towards the portion 12*b* and engage with an outer toothing of the portion 12*b*.

Preferably, the gearbox 5 comprises a radial bearing 33 supporting the output shaft 16 and axially arranged between the sleeve 30 and the portion 12*c*, radially above the portion 12*b* or in a radially outermost position with respect to the portion 12*b*. The radial bearing 33 is radially interposed between the portion 12*b* and the casing of the gearbox 5 to radially support the shaft 16 through the portion 12*b*.

In particular, the bearing 33 is a rolling bearing with an inner race that is fixed with respect to the portion 12*b*.

Hereinafter, some operating modes of the apparatus of the motor vehicle 1 will be described by way of example.

A first operating mode involves the motor vehicle 1 being parked, namely with the wheels 2 immobile or not rotating.

In this operating mode, the control unit ECU can control the engagement device 18 to rotationally fix the gearwheel 9' to the shaft 7, which, in turn, is connected to the shaft 6 through the engagement device 17. Furthermore, the control unit ECU controls the engagement device 20 so that the gearwheel 9" remains free to rotate with respect to the shaft 16 around the axis D. In this way, the motor-generator 4 and the source 3 are connected to each other, while neither of them is connected to the axle or to the wheels 2. By so doing, the motor-generator 4 can generate electrical energy by means of the power supplied by the source 3 or start the source 3.

A second operating mode involves the movement of the motor vehicle 1 using the propulsion of the motor-generator 4 or, more in general, the connection between the wheels 2 or the axle and the motor-generator 4.

In this operating mode, the control unit ECU can control the engagement device 18 to rotationally fix the gearwheel 9' to the shaft 7, which, though, remains disconnected from the shaft 6 through a control of the engagement device 17 by means of the control unit ECU.

By so doing, the motor-generator 4 can transmit power to the shaft 7.

The control unit ECU can thus control one of the engagement devices 20, 21 to rotationally fix one of the gearwheels 9", 11" to the shaft 16, thus respectively engaging one of the fourth gear ratio and the sixth gear ratio.

In this way, the electric motor-generator 4 at least contributes to the propulsion of the motor vehicle 1.

Indeed, in addition, the control unit ECU can control the engagement device 17 to connect the shaft 6 to the shaft 8, as well as one of the engagement devices 21, 22 to engage one of the odd ratios, so that both the source 3 and the motor-generator 4 contribute in parallel to the propulsion of the motor vehicle 1.

Owing to the above, the advantages of the apparatus according to the invention are evident.

The source 3 and the motor-generator 4 can be connected to the parked motor vehicle 1.

In addition, since the motor-generator 4 controls the rotation of the entire gear 9, the engagement device 20 can also be a simple dog-clutch, instead of a synchronizer. This leads to a significant reduction in the radial dimension of the engagement device 20, which can thus be placed in the same axial position along the axes B, D as the engagement device 18.

Furthermore, the motor-generator 4 can be used for the propulsion of the motor vehicle 1 with the most appropriate gear ratios, i.e. with the fourth and the sixth gear ratio for suburban roads.

In addition, the use of the single engagement device 21 to engage an even ratio and an odd ratio allows a significant saving in terms of axial overall dimensions of the gearbox 5.

Finally, the apparatus according to the invention can be subject to changes and variants, which, though, do not go beyond the scope of protection set forth in the appended claims.

In particular, the number, the shape and the arrangement of the components described and shown herein could be different.

Furthermore, each detail depicted in the drawings regarding the arrangement and size of the gears 9, 10, 11, 12, 13, 14, 24 and of the engagement devices 17, 18, 19, 20, 21, 22 must be considered as independent of the other details.

Similarly, the graphic representation of support elements such as for example the bearings for the shafts 7, 8, 16 or the other schematically shown bearings is to be considered merely explanatory and susceptible to variations.

Finally, the representation of FIG. 2 is merely schematic for a better understanding of the key aspects of the description, so it is not to be understood as perfectly realistic.

The invention claimed is:

1. An apparatus with a dual-clutch gearbox for a motor vehicle, the dual-clutch gearbox comprising:

an input shaft to be connected to a power source of the motor vehicle;

a first shaft extending along a straight axis and carrying a plurality of first gearwheels;

a second shaft carrying a plurality of second gearwheels;

an output shaft to be connected to an axle of the motor vehicle, the output shaft carrying a plurality of third gearwheels meshing with the first gearwheels to form first gears and a plurality of fourth gearwheels meshing with the second gearwheels to form second gears;

a double clutch selectively controllable to connect one of the first and second shafts with the input shaft;

wherein at least a fifth gearwheel of the third gearwheels and a sixth gearwheel of the fourth gearwheels are carried in a rotatable manner with respect to the output shaft, a first engagement means arranged axially between the fifth gearwheel and the sixth gearwheel and controllable to selectively and mutually exclusive rotationally fix either the fifth gearwheel or the sixth gearwheel to the output shaft;

characterized in that the first engagement means comprises a sleeve element rotationally fixed to the output shaft and axially sliding on the output shaft between the fifth and sixth gearwheels to engage with one of first axial ends of the fifth and sixth gearwheels, the fifth and sixth gearwheels comprising second axial ends axially opposite to the first axial ends, wherein the dual-clutch gearbox comprises a radial bearing supporting the output shaft and arranged axially between the sleeve element and the second axial end of one of the fifth and sixth gearwheels, the radial bearing being arranged in a radially outer position with respect to the first axial end of the one of the fifth and sixth gearwheels, so as to support the output shaft via the first axial end of the one of the fifth and sixth gearwheels.

2. The apparatus according to claim 1, further comprising:

a reverse gear comprising at least a seventh and an eighth gearwheel respectively carried in a fixed manner by the second shaft and by the output shaft in a rotatable manner with respect to the output shaft, or respectively carried by the second shaft in a rotatable manner with respect to the second shaft and in a fixed manner by the output shaft; and a second engagement means controllable to rotationally fix the gearwheel being carried in a rotatable manner, among the seventh and eighth gearwheels, to a related carrying shaft among the second shaft and the output shaft.

3. The apparatus according to claim 2, wherein the reverse gear is arranged at an axial end of the dual-clutch gearbox opposite to a further axial end comprising the double clutch according to said straight axis.

4. The apparatus according to claim 1, wherein the first shaft and the output shaft carry, respectively, in addition, a ninth gearwheel and a tenth gearwheel meshing with the ninth gearwheel to form a third gear, the ninth gearwheel being carried by the first shaft in a rotatable manner about the first shaft, wherein the tenth gearwheel is carried by the output shaft in a fixed manner with respect to the output shaft or in a rotatable manner with respect to the output shaft.

5. The apparatus according to claim 4, further comprising an electric motor-generator having a rotor coupled to the ninth gearwheel via a transmission, such that a rotation of the rotor can be transmitted to the ninth gearwheel and vice versa.

6. The apparatus according to claim 5, wherein the tenth gearwheel is carried by the output shaft in a rotatable manner with respect to the output shaft.

7. The apparatus according to claim 6, further comprising a second engagement means controllable to rotationally fix the tenth gearwheel to the output shaft.

8. The apparatus according to claim 7, wherein the second engagement means comprises a dog-clutch configured to engage the tenth gear on the output shaft.

9. The apparatus according to claim 4, wherein the first gears are arranged between the third gear and the second gears according to said straight axis.

10. The apparatus according to claim 1, wherein the first gears, and the second gears define respective gear ratios sortable according to an ascending numerical order, so as to correspond to respective degrees of reduction in angular input speed, the degrees of reduction being gradually decreasing, the gear ratios being thus divisible into even ratios and odd ratios according to their numerical order.

11. The apparatus according to claim 10, wherein the fifth and sixth gearwheels are part of respective gears defining one of the even ratios and one of the odd ratios.

12. The apparatus according to claim 11, wherein the even ratio and the odd ratio related to the fifth and sixth gearwheel are the first and last of the gear ratios according to their ascending numerical order.

13. The apparatus according to claim 1, wherein the first engagement means is a synchronizer comprising a synchronizer ring arranged in radial contact with the first axial end of the one of the fifth and sixth gearwheels and axially interposed between the radial bearing and the sleeve element.

14. The apparatus according to claim 1, wherein the first and second shafts are coaxial with each other.

15. A transmission for a motor vehicle, the transmission comprising:

an input shaft configured to be connected to a power source of the motor vehicle;

a first shaft extending along a straight axis and carrying a plurality of first gearwheels, each of the first gearwheels being carried either in a fixed manner by the first shaft, thus defining an element of a set of first rotationally fixed gearwheels, or in a rotatable manner with respect to the first shaft, thus defining an element of a set of first engageable gearwheels;

a second shaft carrying a plurality of second gearwheels, each of the second gearwheels being carried in a fixed manner by the second shaft, thus defining an element of a set of second rotationally fixed gearwheels, or in a rotating manner with respect to the second shaft, thus defining an element of a set of second engageable gearwheels;

an output shaft configured to be connected to an axle of the motor vehicle, the output shaft carrying:

a plurality of third gearwheels meshing with the first gearwheels to form first gear trains, each of the third gearwheels being carried in a fixed manner by the output shaft, thus defining an element of a set of third rotationally fixed gearwheels, or in a rotating manner with respect to the output shaft, thus defining an element of a set of third engageable gearwheels; and a plurality of fourth gearwheels meshing with the second gearwheels to form second gear trains, each of the fourth gearwheels being carried in a fixed manner by the output shaft, thus defining an element of a set of fourth rotationally fixed gearwheels, or in a rotating manner with respect to the output shaft, thus defining an element of a set of fourth engageable gearwheels;

a double clutch controllable to selectively connect one of the first and second shafts with the input shaft;

at least one first engagement device controllable for rotationally fixing a related first engageable gearwheel of the first engageable gearwheels to the first shaft selectively;

at least one second engagement device controllable for rotationally fixing a related second engageable gearwheel of the second engageable gearwheels to the second shaft selectively;

a third engagement device arranged between one of said third gearwheels and one of said fourth gearwheels and controllable to selectively and mutually exclusive rotationally fix either the said one of said third gearwheels or the said one of said fourth gearwheels to the output shaft; and a fourth engagement device controllable to rotationally fix another one of said third gearwheels to the output shaft selectively, characterized in that the third engagement device comprises a sleeve element rotationally fixed to the output shaft and axially sliding on the output shaft between the said one of said third gearwheels and the said one of said fourth gearwheels to engage with one of first axial ends of the said one of said third gearwheels and the said one of said fourth gearwheels, the said one of said third gearwheels and the said one of said fourth gearwheels comprising second axial ends axially opposite to the first axial ends, wherein the double clutch comprises a radial bearing supporting the output shaft and arranged axially between the sleeve element and the second axial end of one of the said one of said third gearwheels and the said one of said fourth gearwheels, the radial bearing being arranged in a radially outer position with respect to the first axial end of the one of the said one of said third gearwheels and the said one of said fourth gearwheels, so as to support the output shaft via the first axial end of the one of the said one of said third gearwheels and the said one of said fourth gearwheels.

16. The transmission according to claim 15, wherein the at least one first engagement device, the at least one second engagement device, the third engagement device, and the fourth engagement device each comprise at least one synchronizer.

17. The transmission according to claim 15, wherein the at least one first engagement device, the at least one second engagement device, the third engagement device, and the fourth engagement device each comprise at least one clutch.

18. The transmission according to claim 15, further comprising a control unit operably connected to the at least one first engagement device, the at least one second engagement device, the third engagement device, and the fourth engagement device, wherein the control unit is operable to selectively fix the first gearwheels, the second gearwheels, the third gear wheels, and the fourth gearwheels to their respective shafts.

19. A motor vehicle, comprising:

a first power drive;

a second power drive;

a drive axle; and a transmission, comprising:

an input;

a first shaft carrying a plurality of first gearwheels, each of the first gearwheels being carried either in a fixed manner by the first shaft, thus defining an element of a set of first rotationally fixed gearwheels, or in a rotatable manner with respect to the first shaft, thus defining an element of a set of first engageable gearwheels;

a second shaft carrying a plurality of second gearwheels, each of the second gearwheels being carried in a fixed manner by the second shaft, thus defining an element of a set of second rotationally fixed gearwheels, or in a rotating manner with respect to the second shaft, thus defining an element of a set of second engageable gearwheels;

an output shaft connected to the drive axle, the output shaft carrying:

a plurality of third gearwheels meshing with the first gearwheels to form first gear trains, each of the third gearwheels being carried in a fixed manner by the output shaft, thus defining an element of a set of third rotationally fixed gearwheels, or in a rotating manner with respect to the output shaft, thus defining an element of a set of third engageable gearwheels; and a plurality of fourth gearwheels meshing with the second gearwheels to form second gear trains, each of the fourth gearwheels being carried in a fixed manner by the output shaft, thus defining an element of a set of fourth rotationally fixed gearwheels, or in a rotating manner with respect to the output shaft, thus defining an element of a set of fourth engageable gearwheels;

a double clutch controllable to selectively connect one of the first and second shafts with the input;

at least one first engagement device controllable for rotationally fixing a related first engageable gearwheel of the first engageable gearwheels to the first shaft selectively;

at least one second engagement device controllable for rotationally fixing a related second engageable gearwheel of the second engageable gearwheels to the second shaft selectively;

a third engagement device arranged between one of said third gearwheels and one of said fourth gearwheels and controllable to selectively and mutually exclusive rotationally fix either the said one of third gearwheels or the said one of fourth gearwheels to the output shaft; and a fourth engagement device controllable to rotationally fix another one of said third gearwheels to the output shaft selectively, characterized in that the third engagement device comprises a sleeve element rotationally fixed to the output shaft and axially sliding on the output shaft between the said one of said third gearwheels and the said one of said fourth gearwheels to engage with one of first axial ends of the said one of said third gearwheels and the said one of said fourth gearwheels, the said one of said third gearwheels and the said one of said fourth gearwheels comprising second axial ends axially opposite to the first axial ends, wherein the double clutch comprises a radial bearing supporting the output shaft and arranged axially between the sleeve element and the second axial end of one of the said one of said third gearwheels and the said one of said fourth gearwheels, the radial bearing being arranged in a radially outer position with respect to the first axial end of the one of the said one of said third gearwheels and the said one of said fourth gearwheels, so as to support the output shaft via the first axial end of the one of the said one of said third gearwheels and the said one of said fourth gearwheels.

* * * * *